Oct. 14, 1941.    W. SCHADE    2,259,004
PHOTOGRAPHIC OBJECTIVE
Filed June 8, 1939    2 Sheets-Sheet 1

FIG. 1

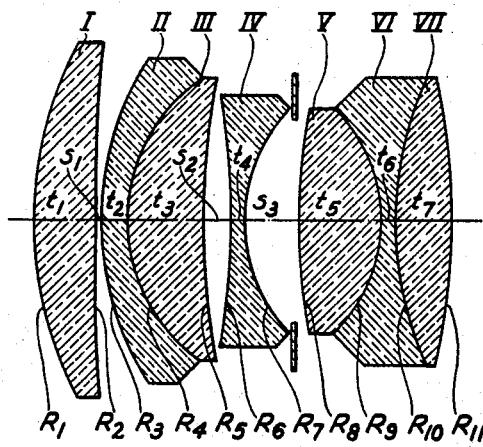

FIG. 2

| LENS | GLASS | RADIUS | THICKNESS |
|---|---|---|---|
| | | | f/1.5    F=100mm. |
| I | $N_D=1.618$  $\nu=53.8$ | $R_1=+\ 73.3$ mm. | $t_1=12.77$ mm. |
| | | $R_2=+\ 425.8$ mm. | $s_1=0.56$ mm. |
| II | $N_D=1.568$  $\nu=42.7$ | $R_3=+\ 58.8$ mm. | $t_2=5.62$ mm. |
| III | $N_D=1.637$  $\nu=55.7$ | $R_4=+\ 33.7$ mm. | $t_3=15.38$ mm. |
| | | $R_5=+\ 151.3$ mm. | $s_2=5.17$ mm. |
| IV | $N_D=1.672$  $\nu=32.2$ | $R_6=-\ 303.7$ mm. | $t_4=3.37$ mm. |
| | | $R_7=+\ 32.8$ mm. | $s_3=14.61$ mm. |
| V | $N_D=1.637$  $\nu=55.7$ | $R_8=+\ 118.0$ mm. | $t_5=18.36$ mm. |
| VI | $N_D=1.522$  $\nu=50.7$ | $R_9=-\ 30.6$ mm. | $t_6=3.37$ mm. |
| VII | $N_D=1.671$  $\nu=47.0$ | $R_{10}=+\ 67.4$ mm. | $t_7=11.23$ mm. |
| | | $R_{11}=-\ 125.9$ mm. | |

FIG. 3

| LENS | GLASS | RADIUS | THICKNESS |
|---|---|---|---|
| | | | f/1.5    F=100mm. |
| I | $N_D=1.638$  $\nu=55.5$ | $R_1=+\ 71.0$ mm. | $t_1=12.14$ mm. |
| | | $R_2=+\ 276.4$ mm. | $s_1=0.58$ mm. |
| II | $N_D=1.567$  $\nu=42.8$ | $R_3=+\ 61.0$ mm. | $t_2=5.81$ mm. |
| III | $N_D=1.638$  $\nu=55.5$ | $R_4=+\ 34.9$ mm. | $t_3=15.90$ mm. |
| | | $R_5=+\ 154.5$ mm. | $s_2=4.77$ mm. |
| IV | $N_D=1.673$  $\nu=32.2$ | $R_6=-\ 354.2$ mm. | $t_4=5.81$ mm. |
| | | $R_7=+\ 34.1$ mm. | $s_3=10.45$ mm. |
| V | $N_D=1.611$  $\nu=57.2$ | $R_8=+\ 133.0$ mm. | $t_5=16.97$ mm. |
| VI | $N_D=1.532$  $\nu=48.9$ | $R_9=-\ 30.6$ mm. | $t_6=3.48$ mm. |
| VII | $N_D=1.745$  $\nu=45.9$ | $R_{10}=+\ 48.9$ mm. | $t_7=15.17$ mm. |
| | | $R_{11}=-\ 152.0$ mm. | |

WILLY SCHADE
INVENTOR

BY
ATTORNEY

Oct. 14, 1941.  W. SCHADE  2,259,004
PHOTOGRAPHIC OBJECTIVE
Filed June 8, 1939   2 Sheets—Sheet 2

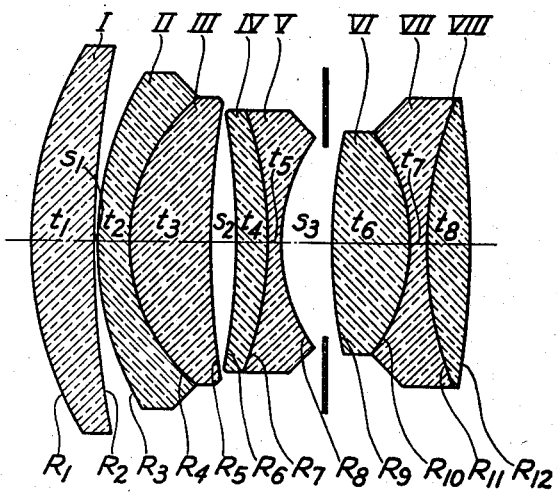

| LENS | GLASS | RADIUS | THICKNESS |
|---|---|---|---|
| | | f/1.5 | F=100mm. |
| I | $N_D=1.638$  $\nu=55.5$ | $R_1 = +\ 73.2$ mm. | $t_1 = 12.53$ mm. |
| | | $R_2 = +285.2$ mm. | $s_1 = 0.60$ mm. |
| II | $N_D=1.567$  $\nu=42.8$ | $R_3 = +\ 62.9$ mm. | $t_2 = 6.02$ mm. |
| III | $N_D=1.638$  $\nu=55.5$ | $R_4 = +\ 36.0$ mm. | $t_3 = 16.45$ mm. |
| | | $R_5 = +159.7$ mm. | $s_2 = 4.33$ mm. |
| IV | $N_D=1.670$  $\nu=47.2$ | $R_6 = -362.0$ mm. | $t_4 = 6.62$ mm. |
| V | $N_D=1.673$  $\nu=32.2$ | $R_7 = -\ 74.7$ mm. | $t_5 = 3.00$ mm. |
| | | $R_8 = +\ 35.2$ mm. | $s_3 = 10.23$ mm. |
| VI | $N_D=1.638$  $\nu=55.5$ | $R_9 = +\ 98.5$ mm. | $t_6 = 15.38$ mm. |
| VII | $N_D=1.501$  $\nu=56.5$ | $R_{10} = -\ 35.3$ mm. | $t_7 = 3.62$ mm. |
| VIII | $N_D=1.745$  $\nu=45.9$ | $R_{11} = +\ 58.6$ mm. | $t_8 = 8.66$ mm. |
| | | $R_{12} = -412.3$ mm. | |

WILLY SCHADE
INVENTOR

BY  *Newton M. Pennie*
ATTORNEY

Patented Oct. 14, 1941

2,259,004

UNITED STATES PATENT OFFICE 2,259,004

PHOTOGRAPHIC OBJECTIVE

Willy Schade, Rochester, N. Y., assignor to Eastman Kodak Company, Rochester, N. Y., a corporation of New Jersey Application June 8, 1939, Serial No. 278,046

8 Claims. (Cl. 88—57)

This invention relates to lens systems and particularly to high aperture photographic objectives.

It is an object of the invention to provide a photographic objective working at an aperture greater than f. 2.

It is a particular object of the invention to provide such an objective which is highly corrected for spherical aberration, chromatic aberration, astigmatism, and coma, and has a covering power of more than 20 degrees measured from the optic axis.

During the last decade or so, a decidedly new type of lens has been developed whose pedigree is not at all easy to trace. However, this type, which is well known to all lens designers, is describable in a general way and includes an unsymmetrical arrangement relative to the diaphragm in which:

The part behind the diaphragm includes two oppositely curved cemented surfaces; this permits accurate control of the field curvature and of the rim rays. Thus this rear part must include at least a cemented triplet and possibly additional cemented or spaced elements. The triplet may consist either of a biconcave element between two positive elements or a biconvex element between two negative elements.

The part in front of the diaphragm includes a negative element adjacent to the diaphragm and either isolated or cemented to other elements of that front part. In front of the negative element, there are at least two positive elements (some of which may be cemented to the negative element), at least one air space and possibly some negative elements. In general, the front component of the system is a single positive element which may be either biconvex or preferably meniscus convex to the front, but, of course, it may be compound if desired.

The present invention relates to this type of lens and improves the corrections thereof by introducing in the front part of the system a biconvex (negative) air lens whereby there is provided two air glass surfaces one concave and the other convex to the diaphragm. In the preferred embodiment of the invention this biconvex air lens is formed between the negative element adjacent the diaphragm and a compound positive component containing a cemented surface concave to the diaphragm. In the most preferred embodiment, the front part of the lens consists of a meniscus positive element concave to the diaphragm, followed by a meniscus negative element cemented to the front of a meniscus positive element also concave to the diaphragm and a biconcave element adjacent to the diaphragm. The biconvex air lens provided by the invention permits, i. e., introduces, a high degree of correction for spherical aberration and rim rays, thus providing an objective having an aperture of f. 1.5 without loss of image quality. This air lens also improves the astigmatism.

Thus the invention is mainly concerned with the front part of the system. Although this invention is applicable to all lenses of this general type and it has previously been proven that the rear component of this type may be either of the two species mentioned above (i. e., a positive between two negatives or a negative between two positives), I have found that my invention is particularly applicable to those lenses in which the rear component consists of a negative element between two positive elements. In the preferred embodiment, this negative element should have a very low refractive index, the rear positive element should have a high refractive index (preferably greater than 1.7) and the front element of the triplet should have a refractive index intermediate to the values of the other two (preferably at least .03 higher than that of the negative element and at least .02 lower than that of the rear element). The index of refraction of the rear element preferably should be at least .12 greater than that of the negative element to which it is cemented.

In the accompanying drawings:

Fig. 1 shows a cross section of a preferred embodiment of my invention.

Fig. 2 shows the data for this embodiment using one set of glasses.

Fig. 3 shows the data for this same embodiment using another set of glasses.

Figs. 4 and 5 illustrate another embodiment.

The system illustrated by Figs. 1 and 2 has the following characteristics:

Maximum aperture=f/1.5  Focal length=100 mm.

| Lens | Glass | Radius | Thickness |
|---|---|---|---|
| I | $N_D$=1.618, $\nu$=53.8 | $R_1$=+73.3 mm. $R_2$=+425.8 | $t_1$=12.77 mm. $s_1$=0.56 |
| II | $N_D$=1.568, $\nu$=42.7 | $R_3$=+58.8 | $t_2$=5.62 |
| III | $N_D$=1.637, $\nu$=55.7 | $R_4$=+33.7 $R_5$=+151.3 | $t_3$=15.38 $s_2$=5.17 |
| IV | $N_D$=1.672, $\nu$=32.2 | $R_6$=−303.7 $R_7$=+32.8 | $t_4$=3.37 $s_3$=14.61 |
| V | $N_D$=1.637, $\nu$=55.7 | $R_8$=+118.0 | $t_5$=18.36 |
| VI | $N_D$=1.522, $\nu$=50.7 | $R_9$=−30.6 $R_{10}$=+67.4 | $t_6$=3.37 |
| VII | $N_D$=1.671, $\nu$=47.0 | $R_{11}$=−125.9 | $t_7$=11.23 |

The system illustrated by Figs. 1 and 3 has the following characteristics:

Maximum aperture=f/1.5  Focal length=100 mm.

| Lens | Glass | Radius | Thickness |
|---|---|---|---|
| I | $N_D$=1.638, $\nu$=55.5 | $R_1$=+71.0 mm. $R_2$=+276.4 | $t_1$=12.14 mm. $s_1$=0.58 |
| II | $N_D$=1.567, $\nu$=42.8 | $R_3$=+61.0 | $t_2$=5.81 |
| III | $N_D$=1.638, $\nu$=55.5 | $R_4$=+34.9 $R_5$=+154.5 | $t_3$=15.90 $s_2$=4.77 |
| IV | $N_D$=1.673, $\nu$=32.2 | $R_6$=−354.2 $R_7$=+34.1 | $t_4$=5.81 $s_3$=10.45 |
| V | $N_D$=1.611, $\nu$=57.2 | $R_8$=+133.0 | $t_5$=16.97 |
| VI | $N_D$=1.532, $\nu$=48.9 | $R_9$=−30.6 $R_{10}$=+48.9 | $t_6$=3.48 |
| VII | $N$=1.745, $\nu$=45.9 | $R_{11}$=−152.0 | $t_7$=15.17 |

I have discovered that the lenses described by the above table have their fine corrections because of the biconvex air lens formed between elements III and IV, which air lens works particularly well with the doublet consisting of elements II and III. Element II is negative and element III is positive. The meniscus shape of these two elements II and III provides increased flatness of field. The biconvex air lens provides reduced astigmatism and reduced spherical aberration. Of course, it is well understood that all parts of any lens system cooperate, but these particular corrections form the salient advantages of my invention.

Furthermore, this invention is particularly applicable to the system illustrated wherein the rear component is a triplet having a biconcave element cemented between two biconvex elements, whose refractive indices are higher than that of the biconcave element and in which the rear element has the highest refractive index of the three.

In the preferred embodiment illustrated, the front surface of the system has a radius of curvature between .5F and F, where F is the focal length of the whole lens. Similarly the second surface has a radius of curvature between 2F and infinity; $R_3$ is between .5% and F; $R_4$ is between .25F and .5F; $R_5$ is between F and infinity. Similarly $R_6$ is between 2F and infinity; $R_7$ is between .25F and .5F; $R_8$ and $R_{11}$ are between .75F and infinity, and $R_9$ and $R_{10}$ are between .25F and F. Furthermore, only lenses II and VI have an index of refraction for the D lines less than 1.6. In fact, it is desirable to have the index of refraction for lens VI very low, preferably below 1.55.

Another particularly useful embodiment of the invention is shown in Figs. 4 and 5 wherein the third component, i. e., the negative component, is compound. This particular lens has the following characteristics:

Maximum aperture=f/1.5  Focal length=100 mm.

| Lens | Glass | Radius | Thickness |
|---|---|---|---|
| I | $N_D$=1.638, $\nu$=55.5 | $R_1$=+73.2 mm. $R_2$=+285.2 | $t_1$=12.53 mm. $s_1$=0.60 |
| II | $N_D$=1.567, $\nu$=42.8 | $R_3$=+62.9 | $t_2$=6.02 |
| III | $N_D$=1.638, $\nu$=55.5 | $R_4$=+36.0 $R_5$=+159.7 | $t_3$=16.45 $s_2$=4.33 |
| IV | $N_D$=1.670, $\nu$=47.2 | $R_6$=−362.0 $R_7$=−74.7 | $t_4$=6.62 $t_5$=3.00 |
| V | $N_D$=1.673, $\nu$=32.2 | | $s_3$=10.23 |
| VI | $N_D$=1.638, $\nu$=55.5 | $R_8$=+35.2 $R_9$=+98.5 $R_{10}$=−35.3 | $t_6$=15.38 |
| VII | $N_D$=1.501, $\nu$=56.5 | $R_{11}$=+58.6 | $t_7$=3.62 |
| VIII | $N_D$=1.745, $\nu$=45.9 | $R_{12}$=−412.3 | $t_8$=8.66 |

It will be seen from the above table that a glass of extremely low index is used for element VII. However, the particular glass selected does not have the dispersive power necessary for achromatization. The introduction of element IV having substantially the same index as element V permits correction for the chromatic error introduced by the glass used as element VII, without requiring complete redesign of the system. Thus this embodiment is effectively equivalent to that shown in Fig. 1 with the added advantage of an extremely high index break at surface $R_{11}$. Of course, an index break as well as a dispersion break could be introduced at surface $R_7$ and the rest of the lens design adjusted accordingly.

It will be noted that the corresponding curvatures of this Fig. 4 fall within the limits given above for Fig. 1. However, it is to be understood that my invention is not limited to these preferred embodiments but is of the scope of the appended claims.

What I claim and desire to secure by Letters Patent of the United States is:

1. A highly corrected photographic objective of the unsymmetrical type comprising four components axially aligned and air spaced apart and in which behind the diaphragm there is a compound collective component having two oppositely curved cemented surfaces and in which there is a negative component immediately in front of the diaphragm and a plurality of positive components in front of the negative component, the objective being characterized by including three components in front of the diaphragm, the first one being collective, the second one being collective and compound with a cemented surface convex to the incident light, the index of refraction of the glass following this cemented surface being at least .04 greater than that of the glass preceding this surface, and the third one being a biconcave negative element and enclosing with the second component a biconvex negative air lens whose axial thickness is less than one-tenth of the focal length of the objective.

2. An objective according to claim 1 further characterized by the front component being a meniscus element convex to the incident light, the second component being a negative element whose index of refraction is less than 1.6 cemented to the front of a positive element and having all its refractive surfaces convex to the incident light and the third component being a single biconcave element.

3. An objective according to claim 1 further characterized by the component behind the diaphragm consisting of a biconvex cemented triplet including as its middle element a biconcave element whose index of refraction is less than that of either of the other elements of this triplet.

4. An objective according to claim 1 further characterized by the component behind the diaphragm consisting of a biconvex cemented triplet including as its middle element a biconcave element of glass of low refractive index, the rear element of said triplet being of glass of high refractive index and the front element of the triplet having a refractive index intermediate to the values of the other two.

5. A highly corrected photographic objective comprising four air spaced components of which the front one is a collective meniscus element convex to the incident light, the second one is a collective meniscus doublet convex to the incident light consisting of a negative element whose index of refraction is less than 1.6 cemented to the front of a positive element whose index of refraction is greater than 1.6, the third one is a biconcave component forming a biconvex air lens with the second component whose axial thickness is less than one-tenth of the focal length of the objective and the fourth one is a cemented triplet having a biconcave element whose index of refraction for the D line is between 1.48 and 1.55, cemented between two positive elements of which the front element has an index of refraction for the D line between .03 and .3 greater than that of said biconcave element and the rear element has an index of refraction for the D line between .12 and .12 and .5 greater than that of said biconcave element and at least .02 greater than that of said front element of the triplet.

6. An objective according to claim 5 in which the rear element has an index of refraction for the D line greater than 1.7.

7. A highly corrected photographed objective comprising four components, the first component being a collective meniscus element convex to the incident light with a radius of curvature for its front surface between .5F and F, a radius of curvature for its rear surface greater than 2F, the second component consisting of a doublet having a flint glass element cemented to the front of a crown glass element and having all of its refractive surfaces convex to the incident light with a radius of curvature for its front surface between .5F and F, a radius of curvature for its cemented surface between .25F and .5F and a radius of curvature for its rear surface greater than F, the third component being a biconcave lens with a radius of curvature for its front surface greater than 2F and a radius of curvature for its rear surface between .25F and .5F and the fourth component being a biconvex cemented triplet including as its middle element a biconcave element, and having a radius of curvature for each of its outer surfaces greater than .75F, a radius of curvature for each of its cemented surfaces between .25F and F, where F is the focal length of the whole objective, the index of refraction for the second and second last elements of the system being less than 1.6 and for the other elements being greater than 1.6.

8. An objective according to claim 7 in which said third component is compounded of two glasses having substantially the same refractive index and different dispersive indices and the second last element has an index of refraction of about 1.5.

WILLY SCHADE.

CERTIFICATE OF CORRECTION.

Patent No. 2,259,004. October 14, 1941.

WILLY SCHADE.

It is hereby certified that error appears in the printed specification of the above numbered patent requiring correction as follows: Page 3, first column, line 39, claim 5, for ".12 and .12 and .5" read --.12 and .5--; and that the said Letters Patent should be read with this correction therein that the same may conform to the record of the case in the Patent Office.

Signed and sealed this 9th day of December, A. D. 1941.

Henry Van Arsdale,
Acting Commissioner of Patents.

(Seal)